United States Patent
Emamjomeh et al.

(10) Patent No.: US 12,116,491 B2
(45) Date of Patent: *Oct. 15, 2024

(54) COMPOSITE PARTICULATE BUILD MATERIALS

(71) Applicant: Hewlett-Packard Development Company, L.P., Spring, TX (US)

(72) Inventors: Ali Emamjomeh, San Diego, CA (US); Erica Montei Fung, San Diego, CA (US); Alexey S. Kabalnov, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,165

(22) Filed: Jul. 9, 2023

(65) Prior Publication Data

US 2023/0348741 A1    Nov. 2, 2023

Related U.S. Application Data

(60) Continuation of application No. 17/235,554, filed on Apr. 20, 2021, now Pat. No. 11,732,150, which is a division of application No. 16/065,217, filed as application No. PCT/US2016/027983 on Apr. 15, 2016, now abandoned.

(51) Int. Cl.
| | | |
|---|---|---|
| *C09D 11/102* | (2014.01) | |
| *B33Y 70/10* | (2020.01) | |
| *C08J 3/12* | (2006.01) | |
| *C08J 3/205* | (2006.01) | |
| *C08J 3/28* | (2006.01) | |
| *C08J 7/02* | (2006.01) | |
| *C09D 11/101* | (2014.01) | |
| *B29C 64/165* | (2017.01) | |
| *B29K 77/00* | (2006.01) | |
| *B29K 309/00* | (2006.01) | |
| *B29K 309/08* | (2006.01) | |
| *C08K 3/34* | (2006.01) | |
| *C08K 3/40* | (2006.01) | |
| *C08K 7/00* | (2006.01) | |
| *C08K 7/14* | (2006.01) | |

(52) U.S. Cl.
CPC ............ *C09D 11/102* (2013.01); *B33Y 70/10* (2020.01); *C08J 3/12* (2013.01); *C08J 3/205* (2013.01); *C08J 3/28* (2013.01); *C08J 7/02* (2013.01); *C09D 11/101* (2013.01); *B29C 64/165* (2017.08); *B29K 2077/00* (2013.01); *B29K 2309/08* (2013.01); *B29K 2309/14* (2013.01); *C08J 2377/04* (2013.01); *C08K 2003/343* (2013.01); *C08K 3/40* (2013.01); *C08K 7/00* (2013.01); *C08K 7/14* (2013.01)

(58) Field of Classification Search
CPC ................................... C08J 3/205; C08J 3/28
See application file for complete search history.

(56) References Cited

U.S. PATENT DOCUMENTS

| | | | |
|---|---|---|---|
| 5,182,103 A | 1/1993 | Nakane et al. | |
| 5,187,220 A | 2/1993 | Richart et al. | |
| 6,003,832 A | 12/1999 | Ueno et al. | |
| 6,786,711 B2 | 9/2004 | Koch et al. | |
| 8,247,492 B2 | 8/2012 | Martinoni | |
| 8,592,519 B2 | 11/2013 | Martinoni | |
| 8,741,998 B2 | 6/2014 | l'Abee et al. | |
| 8,883,905 B2 * | 11/2014 | Takano | C09D 7/67 106/404 |
| 9,114,567 B2 | 8/2015 | Monsheimer et al. | |
| 9,233,505 B2 | 1/2016 | Martinoni | |
| 11,732,150 B2 * | 8/2023 | Emamjomeh | C09D 11/102 524/449 |
| 2005/0207931 A1 | 9/2005 | Hesse et al. | |
| 2007/0241482 A1 | 10/2007 | Giller et al. | |
| 2010/0068330 A1 | 3/2010 | Martinoni | |
| 2013/0234370 A1 | 9/2013 | Suzuki et al. | |

FOREIGN PATENT DOCUMENTS

| | | |
|---|---|---|
| CN | 1954022 A | 4/2007 |
| CN | 1976799 A | 6/2007 |
| CN | 103205107 A | 7/2013 |
| EP | 0269324 A2 | 6/1988 |
| EP | 2543700 A1 | 1/2013 |
| EP | 2379311 B1 | 5/2018 |
| JP | H04-063862 A | 2/1992 |

(Continued)

OTHER PUBLICATIONS

Jiaming Bai, "Development of a polyamide 12/carbon nanotube nanocomposite for laser sintering", Aug. 21, 2013 (Aug. 21, 2013), pp. 1-199.

(Continued)

*Primary Examiner* — Vickey Nerangis
(74) *Attorney, Agent, or Firm* — Dierker & Kavanaugh, P.C.

(57) ABSTRACT

The present disclosure is drawn to a composite particulate build material, including 92 wt % to 99.5 wt % polymeric particles having an average size from 10 μm to 150 μm and an average aspect ratio of less than 2:1. The composite particulate build material further includes from 0.5 wt % to 8 wt % reinforcing particles having an average size of 0.1 μm to 20 μm and an average aspect ratio of 3:1 to 100:1 applied to surfaces of the polymeric particles, wherein the reinforcing particles include mica or glass.

10 Claims, 2 Drawing Sheets

(56) References Cited

FOREIGN PATENT DOCUMENTS

| JP | H04-090567 A | 3/1992 |
| JP | H06-234863 A | 8/1994 |
| JP | 2007-535585 A | 12/2007 |
| JP | 2010-509459 A | 3/2010 |
| JP | 2012-513319 A | 6/2012 |
| JP | 2012-140625 A | 7/2012 |
| JP | 2013-060364 A | 4/2013 |
| KR | 10-2006-0071340 A | 6/2006 |
| KR | 10-2015-0128496 A | 11/2015 |
| WO | 2004/037902 A1 | 5/2004 |
| WO | 2005/090056 A1 | 9/2005 |
| WO | 2005/105412 A1 | 11/2005 |
| WO | 2007/051691 A1 | 5/2007 |
| WO | 2014/173861 A1 | 10/2014 |
| WO | 2015/108544 A1 | 7/2015 |
| WO | 2015/149054 A1 | 10/2015 |
| WO | 2015/157148 A1 | 10/2015 |
| WO | 2015/165361 A1 | 11/2015 |

OTHER PUBLICATIONS

Machine translation of JP H06-234863 A, published Aug. 23, 1994.
Machine translation of WO 2005/090056 A1, published Sep. 29, 2005. (Year: 2005).
Machine translation of WO 2005/105412 A1, published Nov. 10, 2005 <<retrieved from Espacenet.com on Oct. 20, 2022 >>.
Merck, "Beauty in an Instant", xp002795350, Oct. 29, 2019, 11 pages.
Merck, "Iriodin_Product Information", Dec. 13, 2017 (Dec. 13, 2017), 7 pages. Retrieved from the Internet: URL: https://www.merckgroup.com/en/brands/pm/iriodin.html.
Preda, F., M., et al., "Dynamics of polyamide in the solid state in presence of solvents and in the molten state", HAL open science, Aug. 30, 2016, pp. 1-202. XP055942270.

* cited by examiner

COMPOSITE PARTICULATE BUILD MATERIALS

CROSS-REFERENCE TO RELATED APPLICATIONS

This application is a continuation of U.S. application Ser. No. 17/235,554, filed Apr. 20, 2021, which itself is a divisional application of U.S. application Ser. No. 16/065,217, filed Jun. 22, 2018, which itself is a national stage entry under 35 U.S.C. § 371 of PCT/US2016/027983, filed Apr. 15, 2016, each of which is incorporated by reference herein in its entirety.

BACKGROUND

Methods of 3-dimensional (3D) digital printing, a type of additive manufacturing, have continued to be developed over the last few decades. However, systems for 3D printing have historically been very expensive, though those expenses have been coming down to more affordable levels recently. In general, 3D printing technology improves the product development cycle by allowing rapid creation of prototype models for reviewing and testing. Various methods for 3D printing have been developed, including heat-assisted extrusion, selective laser sintering (SLS), fused deposition modeling (FDM), photolithography, as well as others. Accordingly, development of new 3D printing technologies continues, including in the area of providing improved 3D printed objects.

DETAILED DESCRIPTION

The present disclosure relates to composite particulate build material to provide reinforcement or added strength and other improved physical properties for three-dimensional (3D) printed parts. Typically, non-spherical smaller particles (high aspect ratio, e.g., from 3:1 to 100:1 with particles sizes up to about 30 μm along the longest axis) are difficult to spread evenly as thin layer in a 3D build material powder beds of larger more symmetrical particles because the smaller asymmetric particles do not stay homogenously dispersed when addressed by a blade or a roller in preparation for layer by layer powder bed printing. By physically embedding or attaching these reinforcement additives onto powder particle surfaces, the reinforcement particles can be more homogeneously found throughout the printed part because the reinforcement particles do not separate from polymeric particles during the process of powder layering. Thus, the present disclosure relates to powder bed 3D printing technology where 3D parts can be prepared with enhanced structural properties. Essentially, a composite particulate build material, which can include a fusible polymer (particulate or powder) includes reinforcing particles applied (e.g., adhered, embedded, or attached), to the surface of the particles, which can be spread out layer by layer in a configuration to receive an ink or multiple inks for fusing the composite particulate build material.

In accordance with this, the present disclosure is drawn to a composite particulate build material including from 92 wt % to 99.5 wt % polymeric particles having an average size from 10 μm to 150 μm and an average aspect ratio of less than 2:1. The composite particulate build material can further include from 0.5 wt % to 8 wt % reinforcing particles having an average size of 0.1 μm to 20 μm and an average aspect ratio of 3:1 to 100:1 applied to a surface of the polymeric particles. "Average size" is based on particle size where the longest axis of the particle is measured, and the distribution of particle size is averaged. "Aspect ratio" is based on the longest axis of the particle compared to the shortest axis of the particle which is then averaged over the distribution of particles.

In another example, a method of making a composite particulate build material can include admixing polymeric particles having an average size from 10 μm to 150 μm and an average aspect ratio of less than 2:1 with reinforcing particles having an average size of 0.1 μm to 20 μm and an average aspect ratio of 3:1 to 100:1 in the presence of a polymer swelling solvent. An additional step can include allowing the polymeric particles to swell such that the reinforcing particles to become embedded on a surface of the polymeric particles to form the composite particulate build material.

In another example, a material set for 3D printing can include a composite particulate build material and a fusible ink. The composite particulate build material can include 92 wt % to 99.5 wt % polymeric particles having an average size from 10 μm to 150 μm and an average aspect ratio of less than 2:1, and 0.5 wt % to 8 wt % reinforcing particles having an average size of 0.1 μm to 20 μm and an average aspect ratio of 3:1 to 100:1 applied to surfaces of the polymeric particles. The fusible ink can include a liquid vehicle, and electromagnetic radiation absorbing solids dispersed in the liquid vehicle which is suitable for receiving electromagnetic energy from an energy source and fusing with the composite particulate build material when contacted with the composite particulate build material and irradiated by the electromagnetic energy.

In the present disclosure, it is noted that when discussing the composite particulate build material, the method, or the material set, each of these discussions can be considered applicable to each of these examples, whether or not they are explicitly discussed in the context of that example. Thus, for example, in discussing details about the composite particulate build material per se, such discussion also refers to the method or material set, and vice versa.

In examples of the present disclosure, this technology can be used with a wide variety of printing architecture, including piezo printing systems or thermal inkjet printing systems. In one example, HP's Multi Jet Fusion technology, which may utilize their innovative page-wide thermal inkjet (TIJ) printing technology, can be used, thus benefitting from drop-on-demand digital patterning making possible the printing at any location in a print zone at a high spatial resolution. High spatial resolution and "all-points-addressability" makes it possible to dispense a range of inks into and onto the composite particulate build material at the unit voxel scale. For example, a general example of a 3D printing process begins with the application of a thin powder or particulate layer (which is the composite particulate build material in the present disclosure) in the working zone of the printer. Next, the powder or particulate layer surface is patterned with an ink that is typically an electromagnetic energy-absorbing ink (e.g. IR absorbing ink) or may provide coalescence simply by drying without added energy. In the case of energy-absorbing ink, once patterned, the powder layer is exposed to a high energy photo energy source that matches or overlaps the frequency at which the electromagnetic energy-absorbing ink is activated. For example, for an IR absorbing ink, an infra-red photo energy source can be used that selectively fuses regions that have been printed with the IR absorbing ink, leaving unprinted areas unchanged. The unfused powder can then be removed (immediately but more typically at the end of the process) leaving behind a 3D pattern. This layer-by-layer process can be repeated as many times as desired to produce a final 3D component.

Figure 1:
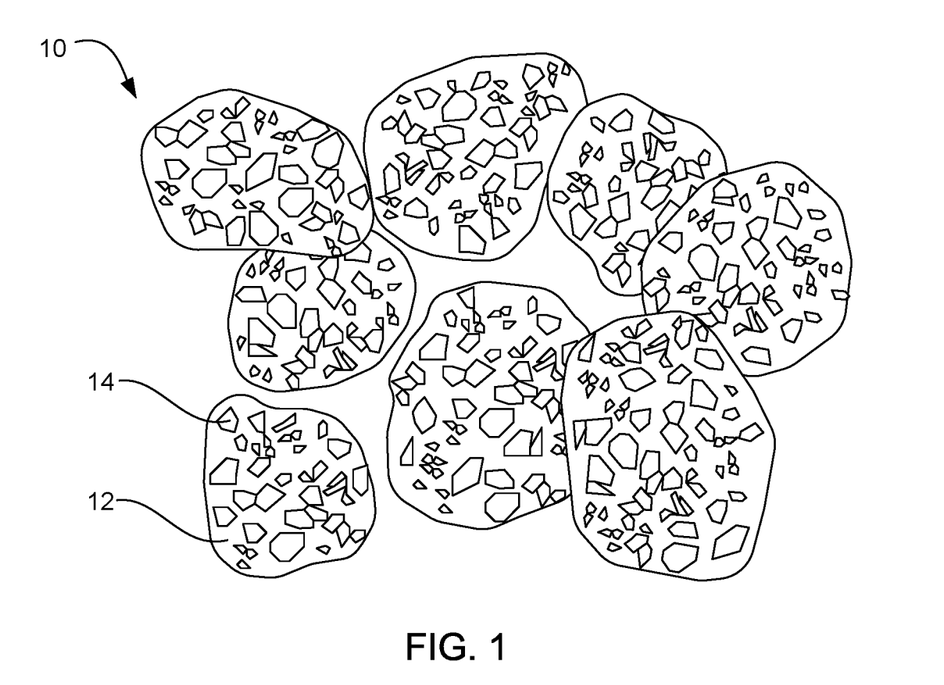
FIG. 1 is a schematic representation of composite particulate build material particles in accordance with examples of the present disclosure.
Figure 2:
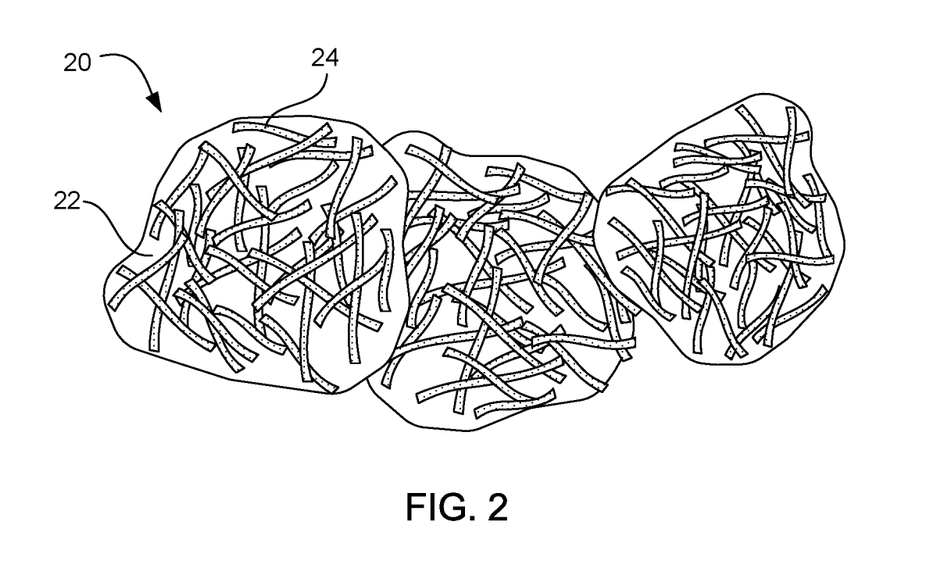
FIG. 2 is a schematic representation of composite particulate build material particles in accordance with alternative examples of the present disclosure.

With respect to the composite particulate build material per se, generally, there is a polymeric particle and a reinforcing particle applied to the surface thereof. In FIG. 1, a composite particulate build material is shown at 10, which comprises a plurality of composite particulates. The particulates include a polymeric particle 12 with reinforcing particles adhered to the surfaced thereof, which in this example, are plate-like structures such as mica particles 14. FIG. 2 is similar with a composite particulate build material is shown at 20, which comprises a plurality of composite particulates. The particulates include a polymeric particle 22 with reinforcing particles adhered to the surfaced thereof, which in this example, are fibers 24 such as glass fibers.

Classes of polymers that can be used for the polymeric particulate include, generally, nylons, thermoplastic elastomers, urethanes, polycarbonates, polystyrenes, polyacetals, polypropylenes, polyesters, polyether ketones, polyacrylates, thermal polyurethanes, thermoplastic polyurethanes, engineered plastics, polyethylenes, polyethylene terephthalates (PET), amorphous polymers thereof, blends thereof, core-shell composites thereof, etc. In one specific example, the particulate polymer can be a polyamide (or "PA"), e.g., nylon 11 (PA-11), nylon 12 (PA-12), nylon 6 (PA-6), nylon 8 (PA-8), nylon 9 (PA-9), nylon 11 (PA-11), nylon 66 (PA-66), nylon 612 (PA-612), nylon 612 (PA-612), nylon 812 (PA-812), nylon 912 (PA-912), etc. In certain examples, the polymeric particles of the composite polymeric build material can have a melting or softening point from about 70° C. to about 350° C. In further examples, the polymeric particles can have a melting or softening point from about 150° C. to about 200° C. In another example, the polymeric particles of the composite can be selected from a set of polymers that possesses moderately low melting points (<200° C.), or higher melting points ranging from 200° C. to 500° C. In a specific example, the particulate polymer can be nylon 12, which can have a melting point from about 175° C. to about 200° C. In another specific example, the particulate polymer can be thermoplastic polyurethane.

Regarding the reinforcing particles that can be applied to the surface of the polymeric particles, particles that are smaller than the polymeric particles and which have a larger aspect ratio can be used to add strength to the printed 3D part once the part is fused. As mentioned, aspect ratios ranging from 3:1 to 100:1 can be used. Other aspect ratios can be from 5:1 to 90:1, from 10:1 to 75:1, or from 20:1 to 60:1. Examples of materials that can be used include mica, talc, or glass. Shapes can thus be elongated fiber structures, such as glass fibers, or flattened plate-like structures, such as mica or talc. Typically, the reinforcing particles are substantially not present below the surface of the polymeric particles, e.g., they are embedded in the surface but typically are not covered by the surface of the polymeric particles. In certain examples, from 10% to 80% of the surface of the polymeric particles are covered by the reinforcing particles by total surface area. In other examples, from 20% to 60% of the surface of the polymeric particles are covered by the reinforcing particles. In other examples, even with the presence of the reinforcing particles on the surface of the polymeric particles, the composite particulate build material can be in the form of a free-flowing particulate suitable for use as a powder bed build material for 3D printing.

In further detail regarding the composite polymeric build material, the polymeric particulate can have an average particle size from 10 µm to 150 µm, from 20 µm to 90 µm, or from 30 µm to 70 µm, and with the reinforcing particles attached to or embedded in the surface thereof, the particle size does not increase significantly, e.g., within about a 20% increase, or within about a 40% increase, in some examples. The composite particulate build material can have a variety of shapes, such as substantially spherical particles, or substantially oval or irregularly-shaped particles up to an average 2:1 aspect ratio (long axis to shortest axis). In some examples, the composite particulate build material can be capable of being formed into 3D printed parts with a resolution of 10 µm to 150 µm. As used herein, "resolution" refers to the size of the smallest feature that can be formed on a 3D printed part. The polymer powder can form layers from about 10 µm to 150 µm thick, or thicker, allowing the coalesced layers of the printed part to have roughly the same thickness. This can provide a resolution in the z-axis direction of about 10 µm to 150 µm. The composite polymeric build material can also have a sufficiently small particle size and sufficiently regular particle shape to provide about 10 µm to 150 µm resolution along the x-axis and y-axis.

In further detail regarding the composite polymeric build material generally, the entire powder bed or a portion of the powder bed can be preheated to a temperature below the melting or softening point of the polymer powder. In one example, the preheat temperature can be from about 10° C. to about 70° C. below the melting or softening point. In another example, the preheat temperature can be within 50° C. of the melting of softening point. In a particular example, the preheat temperature can be from about 160° C. to about 170° C. and the polymer powder can be nylon 12 powder (which has a melting point greater than 170° C., e.g., 175° C. to 200° C. In another example, the preheat temperature can be about 90° C. to about 100° C. and the polymer powder can be thermoplastic polyurethane. Preheating can be accomplished with one or more lamps, an oven, a heated support bed, or other types of heaters. In some examples, the entire powder bed can be heated to a substantially uniform temperature.

Figure 3:
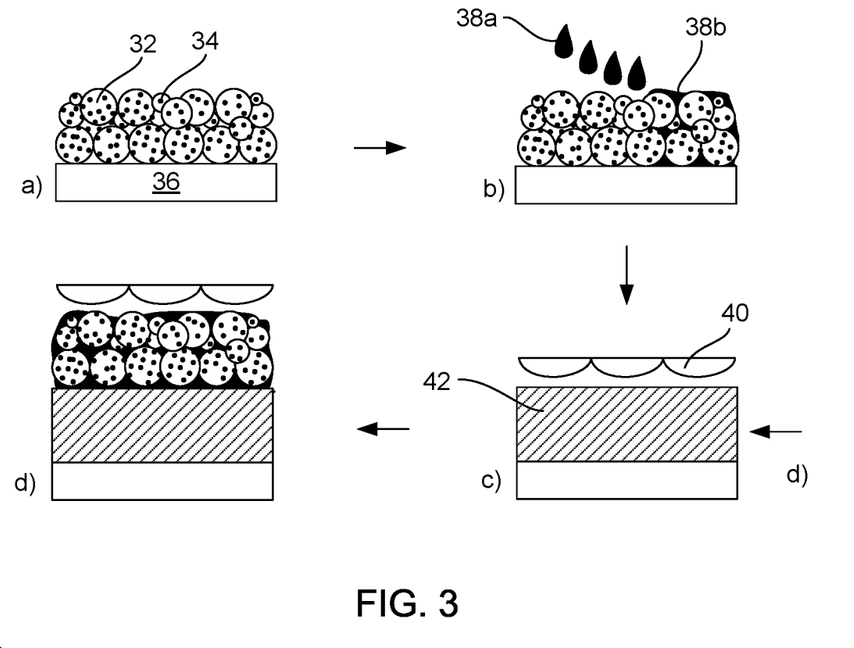
FIG. 3 is a schematic representation depicting material sets and technology in accordance with examples of the present disclosure.

Turning now to the various techniques for building a 3D part as described herein as well as material sets for building 3D parts, FIG. 3 provides a specific example of the present technology. It is noted that there are 4 steps shown (a-d) in FIG. 3 that exemplify aspects of the technology, but this is provided merely for convenience in describing the present technology. A fewer or greater number of steps can be carried out, as desired for a particular application. Additionally, similar structures shown in each of the 4 steps (a-d) are labeled with reference numerals once or twice, but such references are applicable throughout all of FIG. 3 for clarity if viewing and understanding the FIG.

With specific reference to FIG. 3, a) shows substrate or build platform 36 which has a thin layer of composite particulate build material, which in this case includes polymeric particles 32 with reinforcing particles 34 deposited thereon. In other words, the composite particulate build material in this example is spread in a thin layer on the build platform. Because the reinforcing particles are applied to surfaces of the polymeric particles, they do not separate from the larger particles when the thin layer of particles is spread on build platform or build layer using a spreading roller or knife. Next, b) shows microdroplets of a fusible ink 38a as well as already deposited fusible ink 38b within a portion of the composite particulate build material. The fusible ink thus admixes with the build material and is then is then exposed to electromagnetic radiation that, in combination with the fusible ink, is suitable for fusing or forming a layer of the build material and fusible ink together (such as when using IR energy from an IR energy source 40) to form a layer of 3D structure 42. Once this layer is formed, the process is repeated to add an additional layer(s), shown in summary at d), and so forth.

In one example, the powder bed of the composite particulate build material can be irradiated with a fusing lamp configured to emit a wavelength from 800 nm to 1400 nm after a fusible ink is applied thereto or therein (within the a layer of powder). The frequency selected can depend at least in part on the fusing material or electromagnetic receiver or antenna material that is used in the ink. For example, carbon black pigment works well with broad spectrum IR electromagnetic radiation. Other materials may work well with other types of electromagnetic radiation. In this context, suitable fusing lamps can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy.

Turning now to the fusible inks that can be used with the present disclosure, it is notable that the ink can be an inkjet ink with a liquid vehicle and electromagnetic radiation absorbing solids dispersed in the liquid vehicle which are suitable for receiving electromagnetic energy from an energy source and fusing with the composite particulate build material when contacted with the composite particulate build material and irradiated by the electromagnetic energy. The electromagnetic radiation absorbing solids can be any solids that are suitable for receiving electromagnetic energy and fusing with the composite particulate build material described herein. The ink can also include a colorant, such as a pigment or dye colorant that imparts a visible color to the ink, and in some example, the colorant can be one and the same as the electromagnetic radiation absorbing solids, i.e. the pigment provides both color and the energy absorbing properties used to fuse the polymer layer. An example of such a colorant is carbon black, which provides a black colored part, and also provides a suitable antenna for receiving broad spectrum IR radiation from an IR fusing lamp. In some examples, the colorant can be present in an amount from 0.1 wt % to 10 wt % in the ink. In one example, the colorant can be present in an amount from 0.5 wt % to 5 wt %. In another example, the colorant can be present in an amount from 5 wt % to 10 wt %. However, the colorant is optional and in some examples the ink can include no additional colorant, provided there are other solids present that provide acceptable electromagnetic radiation absorbing properties for fusing.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the coalescent ink and/or ultimately, the printed part.

The colorant can be included in the ink to impart color to the printed object and/or to fuse the ink under IR or other energy source when the fusible ink is jetted onto the powder bed. In some examples, however, a set of differently colored inks can be used to print multiple colors. For example, a set of inks including any combination of cyan, magenta, yellow (and/or any other colors), colorless, white, and/or black inks can be used to print objects in full color. Alternatively or additionally, a colorless ink can be used in conjunction with a set of colored inks to impart color. In some examples, a colorless ink can be used to coalesce or fuse the polymer powder and a separate set of colored or black or white inks can be used to impart color.

The inks described herein also include a liquid vehicle. In some examples, the liquid vehicle formulation can be water, or water and one or more co-solvent present in total at from 1 wt % to 50 wt % (of co-solvent), depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can also include dispersants in an amount from 5 wt % to 20 wt %. In addition to the water, the balance of the formulation can be other vehicle components such as biocides, viscosity modifiers, materials for pH adjustment, sequestering agents, preservatives, and the like. In one example, the liquid vehicle can be predominantly water. In some examples, a water-dispersible polymer can be used with an aqueous vehicle. In some examples, the ink can be substantially free of organic solvent. However, in other examples, a co-solvent can be used to help dissolve or disperse dyes or pigments, or improve the jetting properties of the ink, or for other purposes. In still further examples, a non-aqueous vehicle can be used.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

In certain examples, a co-solvent or liquid vehicle can be formulated in general that has a high vapor pressure. In such example, the high vapor pressure vehicle or vehicle components can be formulated to thus evaporate quickly, leaving the DEH stranded on the polymer particles when dispensed on the particulate build material.

One or more surfactants can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, various other additives can be employed to provide desired properties to the ink(s) for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives to modify properties of the ink as desired. Such additives can be present at from 0.01 wt % to 20 wt %.

An example fusible ink formulation is provided in Table 1, as follows:

TABLE 1

| Ingredient | Concentration |
| --- | --- |
| Co-solvent | 15 wt %-35 wt % |
| Surfactant | 0 wt %-3 wt % |
| Anti-kogation/Chelator | 0 wt %-2 wt % |
| Biocide | 0 wt %-1 wt % |
| Fusing Agent[1] | 2 wt %-8 wt % |
| Colorant | 0 wt % to 8 wt % |
| Water[2] | Balance |

[1]Fusing agent may also be a colorant, e.g., carbon black pigment.
[2]Other ingredients in small amounts may also be added as part of the "Balance."

Figure 4:
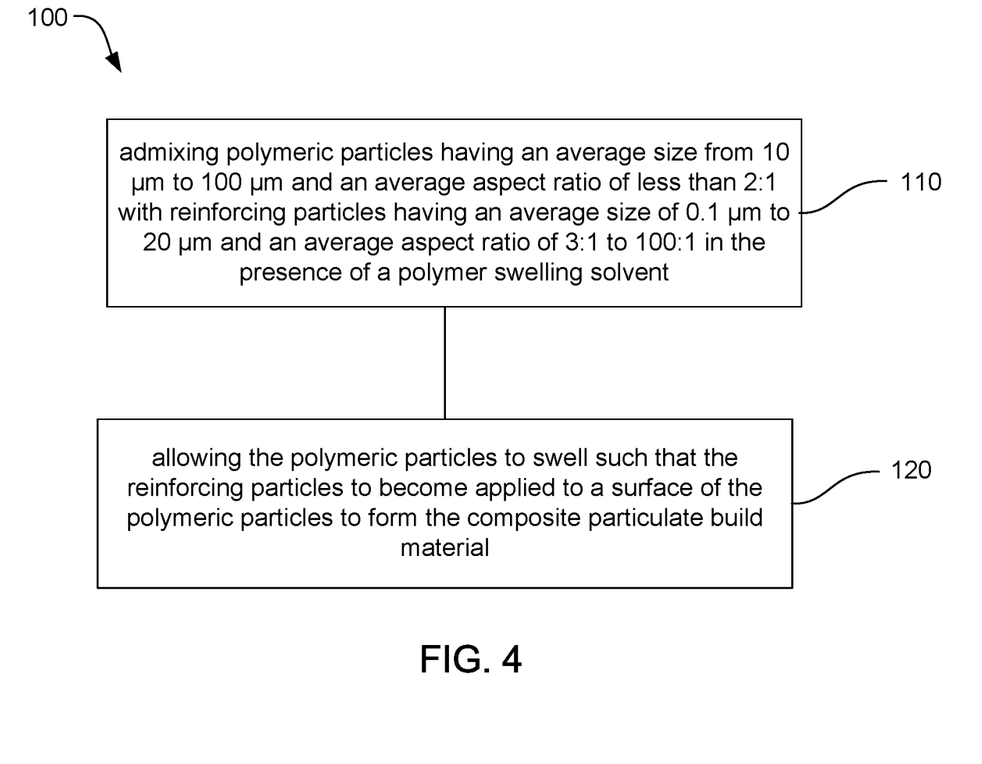
FIG. 4 is a flow chart depicting a method of preparing composite particulate build material in accordance with examples of the present disclosure.

In accordance with FIG. 4, a method 100 of making a composite particulate build material can include admixing 110 polymeric particles having an average size from 10 μm to 150 μm and an average aspect ratio of less than 2:1 with reinforcing particles having an average size of 0.1 μm to 20 μm and an average aspect ratio of 3:1 to 100:1 in the presence of a polymer swelling solvent. An additional step can include allowing 120 the polymeric particles to swell such that the reinforcing particles to become embedded on a surface of the polymeric particles to form the composite particulate build material. The method can further include rinsing and drying the composite particulate build material to leave a particulate composition comprising 92 wt % to 99.5 wt % polymeric particles and 0.5 wt % to 8 wt % reinforcing particles embedded on the surface of the polymeric particles. In another example, the admixing step can include mixing the polymeric particles and the reinforcing particles first, followed by addition of the swelling solvent. In an alternative example, the admixing step can include mixing the swelling solvent and the reinforcing particles first, followed by addition of the polymeric particles. In another example, the admixing step can include mixing the polymeric particles and the polymer swelling solvent first, followed by addition of the reinforcing particles.

In accordance with one example where the polymeric particles and the reinforcing particles are first blended, and then the polymer is swelled to embed the reinforcing particles on the surface of the polymeric particles, the following is a general procedure that can be used or readily adapted. PA-12 (nylon 12) and mica powder are used by example, but the same procedure could be used for other thermoplastic polymers and/or reinforcing particles, e.g., talc, glass fibers, etc. First, a particulate blend can be prepared by weighing out the nylon particles and the mica powder to a predetermined blended weight of each, e.g., from 0.5 wt % to 8 wt % mica with the balance being the nylon particles. Next, the particles can be mixed at high speed to break up compacted areas until visually or otherwise confirmed uniform, e.g., 3500 rpm in a high speed mixer. With a goal of adding a small amount of polymer swelling solvent, e.g., 1.5 wt % m-cresol, the solvent is added in small quantities with short mixing times between additions, e.g., 20-25 drops at a time (about 0.3-0.4 grams, depending on size of batch). Once the batch is mixed, the nylon is swollen and the mica particles become embedded on the nylon surface. Other methodologies can likewise be carried out.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle" or "ink vehicle" refers to a liquid fluid in which additive is placed to form an ink or an inkjettable fluid. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and/or polymers that may be included, the liquid vehicle can carry solid additives such as polymers, latexes, UV curable materials, plasticizers, salts, etc. In some example, the additive carried by the liquid vehicle can be the photosensitive dopant as described herein.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, opaque particles, magnetic particles, aluminas, silicas, and/or other ceramics, organo-metallics, nanoparticles, nanowires, or nanotubes, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "jet," "jettable," "jetting," or the like refers to compositions that are ejected from jetting architecture, such as inkjet architecture. Inkjet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. Likewise, when a composition is "substantially" not present, it refers to only trace amounts or amounts that have virtually no impact of any function of a composition. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Composite Particulate Build Material (Nylon with Mica)

A homogenous mixture of nylon particles (PA-12 from Arkema, Colombes, France) having an average aspect ratio of less than 2:1 (e.g., about 1:1) and an average particles size of about 50 µm was admixed about 7.5 wt % (based on the total particle content) Magnapearl® 1000 mica particles (plate-like structures from BASF) having an average particles size along the longest aspect ratio estimated at about 15 µm to 20 µm. To this was added an m-cresol as a polymer swelling solvent dropwise up to about 1.5 wt % of the composition. The nylon particles were allowed to swell. Viewing under SEM revealed that the mica coated on the surface of the nylon particles were present at a surface area estimated to be about 20 to 35%. Because there were some mica particles that were as large as the nylon particles, notably those few larger particles did not adhere to the surface of the nylon particles.

Example 2—Preparation of Composite Particulate Build Material (Nylon with Mica)

A mixture of Magnapearl® 3000 mica particles (plate-like structures available from BASF) having an average particles size along the longest aspect ratio estimated at about 3 µm to 5 µm was admixed with the polymer swelling solvent m-cresol. Next, nylon particles (PA-12 from Arkema, Colombes, France) having an average aspect ratio of less than 2:1 (e.g., about 1:1) and an average particles size of about 50 µm were admixed with the solvent/mica composition such that the mica was present about 7.5 wt % (based on the total particle content). The solvent concentration added based on the entire composition was about 1.5 wt %. The nylon particles were allowed to swell so that the mica particles could adhere to the surface. Viewing under SEM revealed that some of mica coated on the surface of the nylon particles. However, some of the mica became clumped between nylon parties. Thus, some coating occurred and some particles did not coat on the particles. This coating method was not as effective as that described in Example 1 and 3, but still generated coated particles.

Example 3—Preparation of Composite Particulate Build Material (Nylon with Mica)

A mixture of nylon particles (PA-12 from Arkema, Colombes, France) having an average aspect ratio of less than 2:1 (e.g., about 1:1) and an average particles size of about 50 µm was admixed with the polymer swelling solvent m-cresol which was added dropwise alternating with mixing until about 1.5 wt % m-cresol was present (based on total content of the final product). Next, Magnapearl® 3000 mica particles (plate-like structures) having an average particles size along the longest aspect ratio estimated at about 3 µm to 5 µm were admixed with the solvent/polymer composition such that the mica was present about 7.5 wt % based on the solids content. The nylon particles were then allowed swell. Viewing under SEM revealed that the mica coated on the surface of the nylon particles were present at a surface area estimated to be about 35 to 50%. The method of application of the mica particles to the nylon particles in Example 1 and this example provided about the same success with respect to mica application or surface embedding. However, because the Magnapearl® 1000 (from Example 1) had larger particles (some as large as the nylon particles), there were some larger particles that did not become embedded on the nylon particle surface. It was thus determined that Magnapearl® 3000 mica particles (which are generally smaller and used in the present example) were an even better match for coating 50 µm nylon particles. Thus, in some examples, the use of larger polymeric particles (compared to the 50 µm particles of the present example) would work better with Magnapearl® 1000 mica particles if the goal is to embed more mica particles on the surface with fewer large particles remaining dispersed therewith, though both are acceptable.

Example 4—Preparation of Composite Particulate Build Material (Nylon with Mica)

A homogenous mixture of nylon particles (PA-12 from Arkema, Colombes, France) having an average aspect ratio of less than 2:1 (e.g., about 1:1) and an average particles size of about 50 µm was admixed about 5 wt % Magnapearl® 3000 mica particles (plate-like structures) having an average particles size along the longest aspect ratio of about 3 µm to 5 µm. To this was added about 1.5 wt % m-cresol as a polymer swelling solvent. The swelling polymer allowed the mica particles to attach to its surface. Compared to the surface area of the mica particles attached to the nylon particles described Example 1, a higher surface area coverage can be achieved because the mica particles are small in the present example compared to the relatively large mica particles used in Example 1.

Example 5—Preparation of Composite Particulate Build Material (Nylon with Glass Fiber)

A homogenous mixture of nylon particles (PA-12 from Arkema, Colombes, France) having an average aspect ratio of less than 2:1 (e.g., about 1:1) and an average particles size of about 50 µm is admixed about 7.5 wt % glass fibers (fiber structures) having an average fiber length of about 20 µm. To this is added about 1.5 wt % m-cresol as a polymer swelling solvent. The swelling nylon particles allow the fibers to become attached or embedded on the surface.

Example 6—Physical Property Comparison

Two build materials were prepared for comparison. A first build material was prepared similar to that described in Example 4, and a second build material was prepared using the nylon PA-12 of Example 4, but without the mica applied to the surface. Both build materials were used to form 3D objects using a fusing ink of Table 2 below:

TABLE 2

| Ingredient | Concentration |
| --- | --- |
| Co-solvent | 24.75 wt % |
| Surfactant | 0.4 wt % |
| Anti-kogation and chelating agent | 0.94 wt % |
| Biocide | 0.32 wt % |
| Carbon Black Pigment Fusing Agent (Monarch ® 1100 from Cabot) | 5 wt % |
| Pigment Stabilizer (Joncryl ® 683; Na from BASF) | 1 wt % |
| Water | Balance |

Once the fusing ink was applied, infrared energy was applied at a suitable frequency to the build material and fusing ink to form a solid part. Temperature ranges used to heat the powder prior to and during application of the fusible ink ranged from about 130° C. to about 170° C. Table 3 below provides the comparative data regarding physical property improvements in using mica coated on the surface of the nylon particles.

TABLE 3

|  | Strength MPa | Modulus (stiffness) MPa | Elongation at Break % | Density (g/cc) [Injection Molded (g/cc)] |
|---|---|---|---|---|
| Composite particulate build material (polymer/mica) | 27 | 1000 | 11 | 0.96 [1.00] |
| Build material (polymer only) | 34 | 1900 | 7 | 1.01 [1.02] |

As can be seen in Table 3, by applying the mica to the surface of the nylon particles, there was a 26% increase in strength, which was not expected. There was also a 90% increase in Young's Modulus (stiffness). It was thus unexpected that with such a low loading (~5% wt), such large increases were achieved in strength and stiffness. For comparison purposes, it normally takes about 40 wt % glass beads to double the stiffness. Elongation at break and density were also increased, as shown above.

While the disclosure has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A composite particulate build material, comprising:
   92 wt % to 99 wt % polymeric particles having an average size from 10 μm to 150 μm and an average aspect ratio of less than 2:1; and
   0.5 wt % to 8 wt % reinforcing particles having an average size of 0.1 μm to 20 μm and an average aspect ratio of 3:1 to 100:1 applied to surfaces of the polymeric particles, wherein the reinforcing particles include mica or glass and cover 10% to 50% of surfaces of the polymeric particles by total surface area of the polymeric particles,
   wherein the composite particulate build material is prepared by:
   admixing the polymeric particles with the reinforcing particles in the presence of a polymer swelling solvent;
   allowing the polymeric particles to swell such that the reinforcing particles become applied to the surfaces of the polymeric particles; and
   rinsing and drying the polymeric particles to form the composite particulate build material.

2. The composite particulate build material of claim 1, wherein the polymeric particles include a nylon, a thermoplastic elastomer, a urethane, a polycarbonate, a polystyrene, a polyacetal, a polypropylene, a polyester, a polyether ketone, a polyacrylate, a polyurethane, an engineered plastic, a polyethylene, a polyethylene terephthalate, an amorphous polymer thereof, a blend thereof, or a core-shell composite thereof.

3. The composite particulate build material of claim 1, wherein the reinforcing particles have an elongated fiber structure.

4. The composite particulate build material of claim 1, wherein the reinforcing particles have a flattened plate-like structure.

5. The composite particulate build material of claim 1, wherein the reinforcing particles are substantially not present below the surface of the polymeric particles.

6. The composite particulate build material of claim 1, wherein the composite particulate build material is in the form of a free-flowing particulate suitable for use as a powder bed build material for 3D printing.

7. The composite particulate build material of claim 1, wherein the admixing includes mixing the polymeric particles and the reinforcing particles first, followed by addition of the polymer swelling solvent.

8. The composite particulate build material of claim 1, wherein the admixing includes mixing the polymer swelling solvent and the reinforcing particles first, followed by addition of the polymeric particles.

9. The composite particulate build material of claim 1, wherein the step of admixing includes mixing the polymeric particles and the polymer swelling solvent first, followed by addition of the reinforcing particles.

10. The composite particulate build material of claim 1, wherein the polymer swelling solvent is m-cresol.

* * * * *